United States Patent
Deng et al.

(10) Patent No.: US 10,243,481 B2
(45) Date of Patent: Mar. 26, 2019

(54) POWER SUPPLIES HAVING FEEDFORWARD CONTROL USING PULSE MODULATION AND DEMODULATION

(71) Applicant: Astec International Limited, Kowloon (HK)

(72) Inventors: Shi Jie Deng, Guangdong (CN); Qing Feng Liu, Guangdong (CN); Guang Quan Li, Guangdong (CN); Zhao Fu Zhou, Guangdong (CN)

(73) Assignee: Astec International Limited, Kwun Tong, Kowloon (HK)

( * ) Notice: Subject to any disclaimer, the term of this patent is extended or adjusted under 35 U.S.C. 154(b) by 0 days.

(21) Appl. No.: 15/753,598

(22) PCT Filed: Aug. 31, 2016

(86) PCT No.: PCT/CN2016/097652
§ 371 (c)(1),
(2) Date: Feb. 20, 2018

(87) PCT Pub. No.: WO2018/040013
PCT Pub. Date: Mar. 8, 2018

(65) Prior Publication Data
US 2018/0367056 A1    Dec. 20, 2018

(51) Int. Cl.
*H02M 7/12* (2006.01)
*H02M 1/14* (2006.01)
(Continued)

(52) U.S. Cl.
CPC .............. *H02M 7/12* (2013.01); *H02M 1/14* (2013.01); *H02M 3/156* (2013.01); *H02M 2001/007* (2013.01); *Y02P 80/112* (2015.11)

(58) Field of Classification Search
CPC .......... H02M 1/14; H02M 3/156; H02M 7/12; H02M 2001/007; H02M 3/33546; H02M 7/5395

See application file for complete search history.

(56) References Cited

U.S. PATENT DOCUMENTS

2010/0211132 A1* 8/2010 Nimmagadda ........ A61N 1/378
607/60
2011/0058623 A1* 3/2011 Segoria .................... H03K 5/07
375/295

(Continued)

FOREIGN PATENT DOCUMENTS

CN    101151791 A    3/2008
CN    102089957 A    6/2011

(Continued)

OTHER PUBLICATIONS

Multiple Output Magnetic Feedback Forward Converter with Discrete PWM for Space Application; Pramod Rampelli; IEEE International Conference on Power Electronics; 2012 (6 pages).

*Primary Examiner* — Adolf D Berhane
(74) *Attorney, Agent, or Firm* — Harness, Dickey & Pierce, P.L.C.

(57) ABSTRACT

Example isolated AC-DC power supplies include a PFC converter coupled to an AC input, a DC-DC converter coupled between the PFC converter and a DC output, and a controller configured to control switching operation of the DC-DC converter. A pulse modulator is coupled to an output of the PFC converter to receive a signal representative of voltage ripple at the output of the PFC converter, and is configured to modulate a pulse signal based on an amplitude of the voltage ripple. A pulse demodulator is coupled to the pulse modulator to receive the modulated pulse signal, and is configured to demodulate the modulated pulse signal and provide a demodulated signal to adjust switching operation (Continued)

of the DC-DC converter. Also disclosed are methods for controlling isolated AC-DC power supplies.

22 Claims, 3 Drawing Sheets

(51) Int. Cl.
*H02M 3/156* (2006.01)
*H02M 1/00* (2006.01)

(56) References Cited

U.S. PATENT DOCUMENTS

| | | |
|---|---|---|
| 2014/0160805 A1 | 6/2014 | Oh et al. |
| 2015/0029760 A1 | 1/2015 | Karlsson et al. |
| 2016/0198551 A1* | 7/2016 | Kelly .................. H05B 33/0842 315/291 |
| 2018/0041128 A1* | 2/2018 | Sandusky ............... H02J 3/385 |

FOREIGN PATENT DOCUMENTS

| | | |
|---|---|---|
| CN | 102480816 A | 5/2012 |
| CN | 103346684 A | 10/2013 |

* cited by examiner

POWER SUPPLIES HAVING FEEDFORWARD CONTROL USING PULSE MODULATION AND DEMODULATION

FIELD

The present disclosure relates to power supplies having feedforward control using pulse modulation and demodulation, and methods for controlling power supplies.

BACKGROUND

This section provides background information related to the present disclosure which is not necessarily prior art.

Many isolated power supplies experience AC input dynamic response issues, output dynamic loading issues, line frequency output voltage ripple issues, etc. Feed-forward methods may be used with analog components between primary and secondary sides of a power supply to reduce voltage ripple issues, although accuracy may be decreased due to ranges of component parameters. Digital controllers are used more frequently in AC/DC power supplies. In some power supplies, one digital controller is located in a primary side of the power supply to control input housekeeping, power factor correction (PFC) circuit operation, etc. Another digital controller can be located in an isolated secondary side of the power supply to control output housekeeping, DC/DC conversion operation, etc. using feedback. There may be communication between the primary side digital controller and the secondary side digital controller, although the communication may not be consistent due to resource limitation of the digital controllers.

SUMMARY

This section provides a general summary of the disclosure, and is not a comprehensive disclosure of its full scope or all of its features.

According to one aspect of the present disclosure, an isolated AC-DC power supply includes an input terminal for receiving an AC voltage input, an output terminal for providing a DC voltage output, a PFC converter coupled to the input terminal, a DC-DC converter coupled between the PFC converter and the output terminal, and a controller coupled to the DC-DC converter and configured to control switching operation of the DC-DC converter. The power supply further includes a pulse modulator coupled to an output of the PFC converter to receive a signal representative of voltage ripple at the output of the PFC converter. The pulse modulator is configured to modulate a pulse signal based on an amplitude of the voltage ripple. The power supply further includes a pulse demodulator coupled to pulse modulator to receive the modulated pulse signal. The pulse demodulator is configured to demodulate the modulated pulse signal and provide a demodulated signal to the controller to adjust switching operation of the DC-DC converter.

According to another aspect of the present disclosure, a method of operating an isolated AC-DC power supply is disclosed. The power supply includes a PFC converter coupled to a DC-DC converter, a pulse modulator coupled to an output of the PFC converter, and a pulse demodulator coupled to the pulse modulator. The method includes receiving, at the pulse modulator, a voltage ripple of the voltage at the output of the PFC circuit, modulating, at the pulse modulator, a pulse signal based on an amplitude of the voltage ripple, and transmitting the modulated pulse signal to the pulse demodulator. The method further includes demodulating, at the pulse demodulator, the modulated pulse signal into a demodulated signal representative of the voltage ripple, and controlling a switching operation of the DC-DC converter based on the demodulated signal.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding features throughout the several views of the drawings.

DETAILED DESCRIPTION

Figure 1:
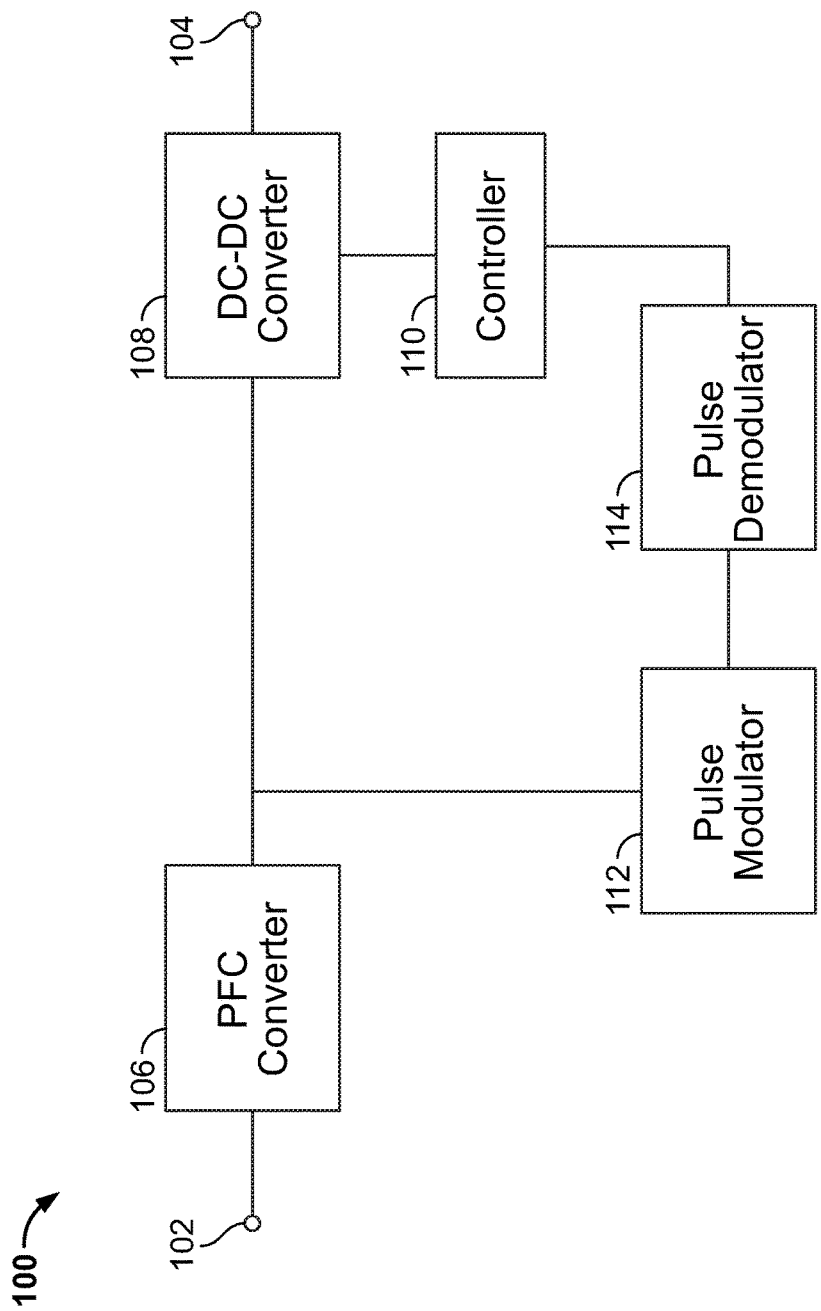
FIG. 1 is a block diagram of an example isolated AC-DC power supply according to one example embodiment of the present disclosure.

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

An isolated AC-DC power supply according to one example embodiment of the present disclosure is illustrated in FIG. 1 and indicated generally by reference number 100. As shown in FIG. 1, the isolated AC-DC power supply 100 includes an input terminal 102 for receiving an alternating current (AC) voltage input from an AC power source and an output terminal 104 for providing a direct current (DC) voltage output to a load. A power factor correction (PFC) converter 106 is coupled to the input terminal 102. A DC-DC converter 108 is coupled between the PFC converter 106 and the output terminal 104. A controller 110 is coupled to the DC-DC converter 108 and configured to control switching operation of the DC-DC converter.

The PFC converter 106 and DC-DC converter 108 are adapted to convert an AC input voltage received at the input terminal 102 to an output DC voltage provided at the output terminal 104. Any suitable AC-DC converter topologies may be used in the power supply 100, including an LLC converter, a fly back converter, a full bridge converter, etc.

The AC-DC power supply 100 includes isolation between a primary side of power supply and a secondary side of the power supply. For example, one or more transformers, etc. may be coupled between the input terminal 102 and the output terminal 104 to provide electrical isolation between the input terminal and the output terminal.

The power supply 100 includes a pulse modulator 112 coupled to an output of the PFC converter 106. The pulse modulator 112 receives a signal representative of voltage ripple (e.g., line frequency voltage ripple) at the output of the PFC converter 106. The pulse modulator 112 is configured to modulate a pulse signal based on an amplitude of the voltage ripple.

The power supply 100 also includes a pulse demodulator 114 coupled to the pulse modulator 112 to receive the modulated pulse signal. The pulse demodulator 114 is configured to demodulate the modulated pulse signal and provide a demodulated signal to the controller 110 to adjust switching operation of the DC-DC converter 108. For example, the controller 110 may adjust switching operation of the DC-DC converter 108 based on the demodulated pulse signal to improve performance of the power supply 100 (e.g., by reducing output voltage ripple, by improving input dynamic response, by improving output dynamic response, etc.).

Accordingly, the power supply 100 provides feedforward control using pulse modulation and demodulation between a primary side and a secondary side of the power supply 100. This feedforward control may improve performance of the power supply 100 (e.g., by reducing voltage ripple at the output terminal 104 of the power supply 100, etc.).

The pulse modulator 112 may be any suitable microprocessor unit (MCU), digital signal processor (DSP), etc. capable of modulating a digital pulse signal. For example, many power supplies include a microprocessor on a primary side of the power supply to control switching of a PFC converter, control input voltage functions, etc. In some embodiments, the pulse modulator 112 may be included in a primary side microprocessor used to control switching of the PFC converter 106, the pulse modulator may be a standalone microprocessor located on a primary side of the power supply 100, etc.

The pulse modulator 112 generates the modulated pulse signal according to the voltage ripple amplitude. For example, the pulse modulator 112 can use pulse width modulation (PWM), pulse frequency modulation (PFM), etc. to modulate a pulse signal based on the voltage ripple amplitude. In some embodiments, the pulse modulator 112 modulates the pulse signal linearly with respect to the amplitude of the voltage ripple.

Similar to the pulse modulator 112, the pulse demodulator 114 can be any suitable MCU, DSP, etc. capable of demodulating a modulated pulse signal. For example, many power supplies include a microprocessor on a secondary side of the power supply to control switching of a DC-DC converter, control output voltage functions, receive feedback of the output voltage, etc. In some embodiments, the pulse demodulator 114 may be included in a secondary side microprocessor used to control switching of the DC-DC converter 108, the pulse demodulator may be a standalone microprocessor located on a secondary side of the power supply 100, etc. Although FIG. 1 illustrates the pulse demodulator 114 as separate from the controller 110, in other embodiments the pulse demodulator 114 may incorporated in the controller 110.

The pulse demodulator 114 receives the modulated pulse signal from the pulse modulator 112, and demodulates the modulated pulse signal. For example, the pulse demodulator 114 may demodulate the modulated pulse signal into a series discrete digital signal having a similar profile to the voltage ripple (e.g., line frequency voltage ripple) at the output of the PFC converter 106. The output signal from the pulse demodulator 114 is provided to the DC-DC converter 108 to reduce voltage ripple at the output of the DC-DC converter. For example, the output signal from the pulse demodulator 114 may be provided to the controller 110 and the controller may adjust operation of the switching of the DC-DC converter 108. For example, the controller 110 may adjust switching operation of the DC-DC converter 108 based on the output signal from the pulse demodulator 114 to reduce voltage ripple at the output of the DC-DC converter.

The voltage ripple may be reduced by any suitable amount using feedforward pulse modulation and demodulation of the power supply 100. For example, the voltage ripple may be reduced by approximately fifty percent from the output of the PFC converter 106 to the output of the DC-DC converter 108, the voltage ripple may be reduced to approximately zero volts, etc.

Figure 2:
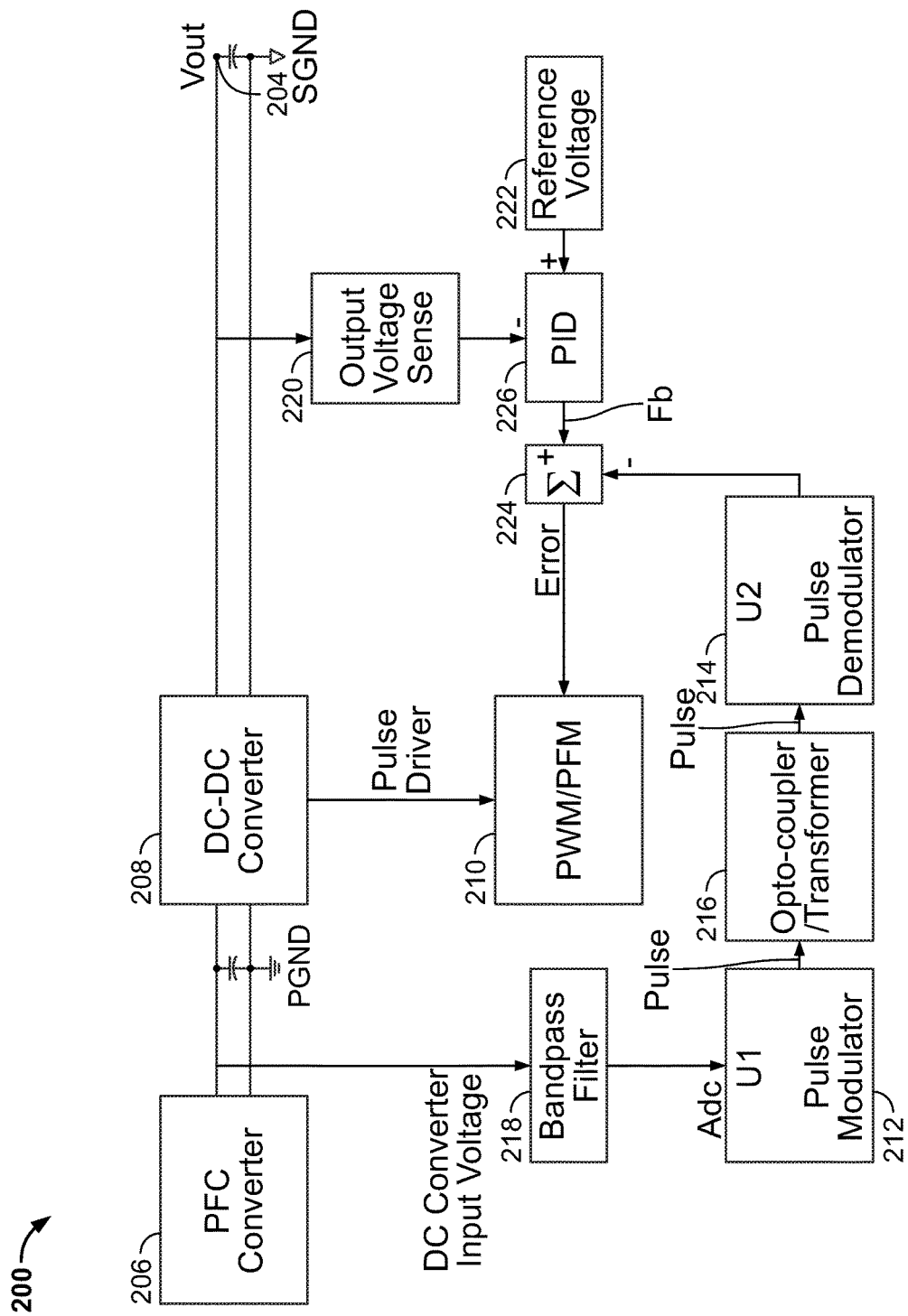
FIG. 2 is a block diagram of another example isolated AC-DC power supply, according to another example embodiment of the present disclosure.

FIG. 2 illustrates an isolated AC-DC power supply 200 according to another example embodiment of the present disclosure. As shown in FIG. 2, the isolated AC-DC power supply 200 includes an output terminal 204 for providing a DC voltage output (Vout) to a load. A DC-DC converter 208 is coupled between a PFC converter 206 and the output terminal 204. A controller 210 is coupled to the DC-DC converter 208 and configured to control switching operation of the DC-DC converter.

The power supply 200 includes a pulse modulator 212 coupled to an output of the PFC converter 206. The pulse modulator 212 receives a signal representative of voltage ripple (e.g., line frequency voltage ripple, input voltage ripple, etc.) at the output of the PFC converter 206. The pulse modulator 212 is configured to modulate a pulse signal based on an amplitude of the voltage ripple.

The power supply 200 includes a pulse demodulator 214 coupled to the pulse modulator 212 to receive the modulated pulse signal. The pulse demodulator 214 is configured to demodulate the modulated pulse signal and provide a demodulated signal to the controller 210 to reduce voltage ripple at the output of the DC-DC converter 208.

Accordingly, similar to the power supply 100 of FIG. 1, the power supply 200 of FIG. 2 provides feedforward control using pulse modulation and demodulation to reduce voltage ripple at the output terminal 204 of the power supply 200.

The power supply 200 further includes a filter 218 coupled between the output of the PFC converter 206 and the pulse modulator 212. The filter 218 is adapted to filter a voltage at the output of the PFC converter 206 and provide a voltage ripple signal to the pulse modulator 212 representative of a voltage ripple at the output of the PFC converter. This allows pulse modulator 212 to modulate a pulse signal based on the amplitude of the voltage ripple at the PFC converter output.

Although filter 218 is illustrated as a bandpass filter, it should be apparent that filter 218 may include any suitable filter capable of filtering the voltage ripple at the output of the PFC converter 206. For example, the filter 218 may let the voltage ripple frequency pass through the filter while rejecting frequencies outside of the voltage ripple frequency bandwidth. The filter 218 may include single order filtering, two order filtering, higher order filtering, etc.

As shown in FIG. 2, the pulse modulator 212 may include an analog-to-digital (ADC) converter. The ADC converter may receive the analog voltage ripple signal from the filter 218 and convert the analog voltage ripple signal into a digital signal that can be modulated by the pulse modulator 212.

Power supply 200 also includes an isolator 216. The isolator 216 is coupled between the pulse modulator 212 and the pulse demodulator 214 to isolate the pulse modulator from the pulse demodulator. Accordingly, the isolator 216 transmits the modulated pulse signal from the pulse modulator 212 to the pulse demodulator 214 while maintaining isolation between a primary side and a secondary side of the power supply 200.

FIG. 2 illustrates the isolator 216 as an opto-coupler or a transformer. However, it should be apparent that isolator 216 can be any suitable isolator (e.g., a transformer, etc.) capable of transmitting the pulse modulated signal while maintaining isolation between the pulse modulator 212 and the pulse demodulator 214.

Accordingly, the power supply 200 provides a feedforward control method to reduce voltage ripple using modulation and demodulation, while maintaining isolation between a primary side and a secondary side of the power supply 200. In this example embodiment, the ADC converter input of the pulse modulator 212 receives a voltage ripple signal from the filter 218, representative of the voltage ripple at the output of the PFC converter 206. The pulse modulator 212 modulates a pulse signal using pulse width modulation, pulse frequency modulation, etc. based on the amplitude of the ripple voltage. The modulated pulse signal is then transmitted to the pulse demodulator 214 via the isolator 216. The pulse demodulator 214 demodulates the pulse signal into a series discrete digital signal having a similar profile to the voltage ripple. The demodulated signal is provided to the DC-DC converter 208 to reduce voltage ripple at the output of the power supply 200.

Referring again to FIG. 2, the power supply 200 includes a sensor 220 coupled to the output terminal 204. The sensor 220 senses an output voltage at the output terminal 204 and provides the sensed output voltage to the controller 210 as feedback for controlling the output voltage.

The power supply 200 also includes a voltage reference 222. The voltage reference 222 provides a desired output voltage of the power supply 200. A proportional-integral-derivative controller (PID controller) 226 is coupled to the voltage reference 222 and the sensor 220 to receive the sensed output voltage and the voltage reference value. The PID controller 226 then provides a PID controlled signal to an error comparator 224.

The error comparator 224 can provide positive feedback, negative feedback, etc. to the signal from the PID controller 225 (i.e., a PID control signal based on the sensed output voltage from the sensor 220 and the voltage reference 222) to determine an error value of the output voltage. This feedback error value is provided to the voltage controller 210 to control switching operation of the DC-DC converter 208. The voltage controller 210 operates the DC-DC converter 208 to maintain a desired output voltage at the output terminal 204, based on the feedback error value. Although FIG. 2 illustrates a PID controller 226 coupled between the sensor 220 and the voltage reference 222, other embodiments may include the sensor 220 and the voltage reference 222 coupled directly to the error comparator 224 (e.g., without an intervening PID controller 226).

The error comparator 224 may also receive the demodulated pulse signal from the pulse demodulator 214. The error comparator 224 can combine the demodulated pulse signal (e.g., feedforward signal representative of the voltage ripple at the output of the PFC converter) with the sensed output voltage and the voltage reference 222 (e.g., the feedback signal of output voltage) provided to the controller 210. Accordingly, the controller 210 can operate the DC-DC converter 208 to both maintain the output voltage at a desired level and reduce a voltage ripple at the output.

Although FIG. 2 illustrates the controller 210, pulse demodulator 214, output voltage sense 220, voltage reference 222, error comparator 224, and PID controller 226 as separate modules, it should be apparent that any (or all) of the modules may be combined into one or more MCU(s), DSP(s), etc. For example, the controller 210 may include an output voltage sensor, a pulse demodulator, a reference voltage input, an error comparator, a PID controller, etc.

Any of the controllers, modulators, demodulators, etc. described herein can be configured using any suitable software and/or hardware configurations. For example, MCU(s), DSP(s), etc. may include any suitable circuitry, logic gates, computer-executable instructions stored in memory, etc. adapted to cause the MCU(S), DSP(s), etc. to perform the functions described herein.

Figure 3:
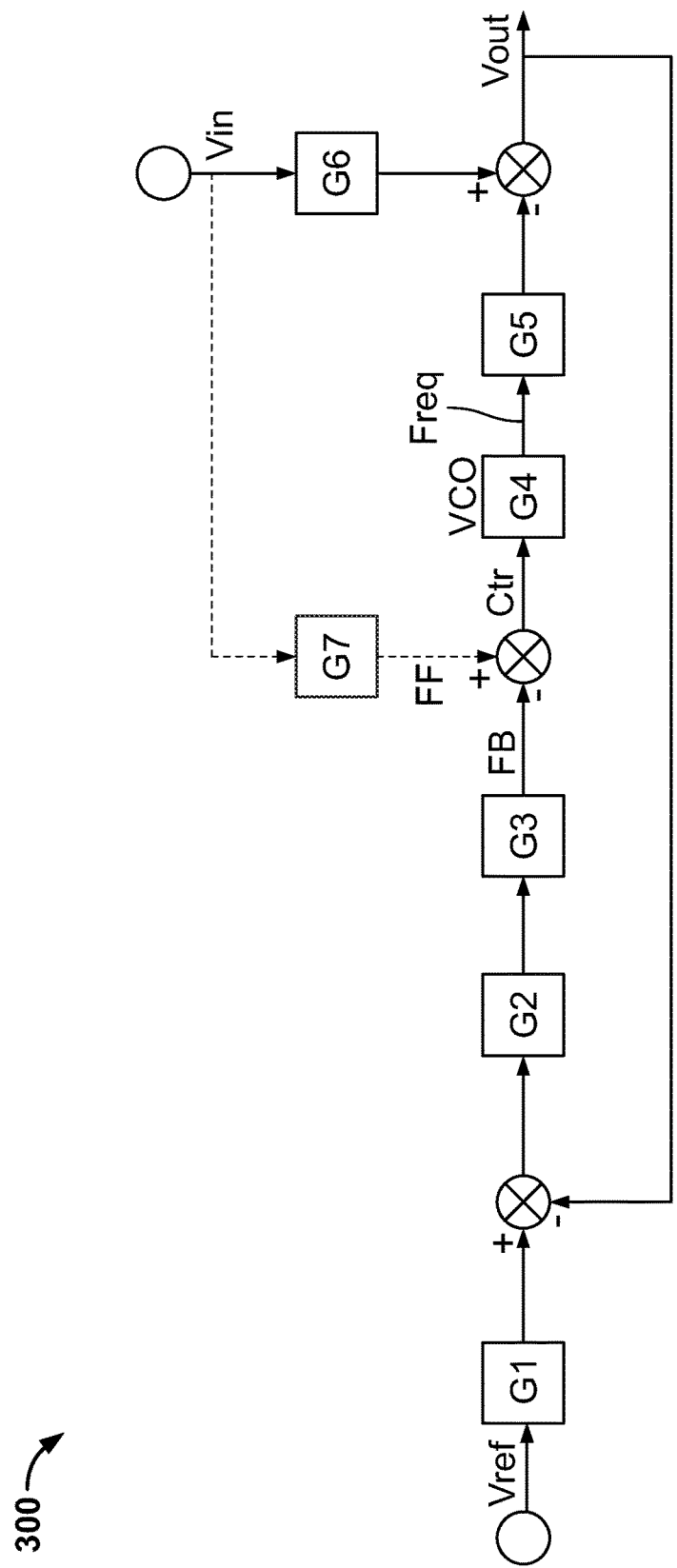
FIG. 3 is a block diagram of a transfer function of an example isolated AC-DC power supply, according to yet another example embodiment of the present disclosure.

FIG. 3 illustrates a block diagram of a transfer function 300 describing the relationship between an input voltage Vin, a reference voltage Vref, and an output voltage Vout. In the transfer function 300, Vout(s)=Gvref(s)*Vref(s)+Gvin (s)*Vin(s), where:

$$Gvref(s) = \frac{G1 \cdot G2 \cdot G3 \cdot G4 \cdot G5}{1 + G2 \cdot G3 \cdot G4 \cdot G5},$$

$$Gvin(s) = \frac{G6 - G4 \cdot G5 \cdot G7}{1 + G2 \cdot G3 \cdot G4 \cdot G5},$$

Gvref(s) is a Vref to output transfer function, Gvin(s) is a Vin to output transfer function, G1 and G2 are voltage controller transfer functions, G3 is an opto-coupler transfer function, G4 is a voltage controlled oscillator transfer function, G5 is a switching frequency to output transfer function, G6 is an input voltage to output transfer function without feedback and feedforward control, and G7 is the input voltage to feedforward signal transfer function.

If GVin_nff is defined as a transfer function without a feedforward signal (i.e., G7=0) the result is:

$$Gvin\_nff(s) = \frac{G6}{1 + G2 \times G3 \times G4 \times G5}$$

This demonstrates how feedback control provides further voltage ripple reduction. A transfer function Ge is defined to evaluate extended gain provided by a feedforward signal such that Ge(s)=GVin(s)/Gvin_nff(s).

Ge describes extended gain with the feedforward signal added. A negative gain of Ge (in dB) is expected for disturbance rejection. If GVin(s) and Gvin_nff are replaced with the above equations, the result is:

$$Ge(s) = 1 - \frac{G4 \cdot G5 \cdot G7}{G6}$$

An ideal rejection is Ge(s)=0. At the condition where G7 is equal to G7 ideal, G7_ideal=G6/(G4*G5).

Although any suitable filter transfer function may be used, if the filter transfer function is selected as:

$$G7(s) = Ke \cdot \frac{2 \cdot \xi \cdot \omega n \cdot s}{s^2 + 2 \cdot \xi \cdot \omega n \cdot s + \omega n^2}$$

where ωn Is a natural oscillation frequency, ξ is a damping coefficient, and Ke is a coefficient of the filter, the result is:

$$Ge(s) = \frac{s^2 + 2 \cdot \left(1 - \frac{Ke}{G7_{ideal}}\right) \cdot \xi \cdot \omega n \cdot s + \omega n^2}{s^2 + 2 \cdot \xi \cdot \omega n \cdot s + \omega n^2},$$

and Ge gain is defined as:

$$Ge\_in\_gain = \sqrt{\frac{\left(\frac{\omega n}{\omega} - \frac{\omega}{\omega n}\right)^2 + \left(1 - \frac{Ke}{G7_{ideal}}\right)^2}{\left(\frac{\omega n}{\omega} - \frac{\omega}{\omega n}\right)^2 + 1}}$$

The extended gain depends on the filtering characteristic ω/ωn, damping coefficient ξ, and the absolute value of (1−(Ke/G7_ideal)). The minimum value is located at ωn, and the minimum gain is equal to the error of Ke in abs(1−(Ke/G7_ideal)). When Ke=G7_ideal, the error is equal to zero and the voltage ripple is cancelled.

Noise frequency deviating from ωn may increase the gain of Ge. The extended gain can approach 1 if the frequency ω approaches zero or positive infinity, which provides the ability to neither influence the DC operation point nor introduce high frequency noise.

As should be apparent, the transfer function 300 is an example embodiment transfer function, but other example embodiment power supplies may use other suitable transfer functions.

In another embodiment, a method of operating an AC-DC power supply is disclosed. The power supply includes a PFC converter coupled to a DC-DC converter, a pulse modulator coupled to an output of the PFC converter, and a pulse demodulator coupled to the pulse modulator. The method generally includes receiving, at the pulse modulator, a voltage ripple of the voltage at the output of the PFC circuit, modulating, at the pulse modulator, a pulse signal based on an amplitude of the voltage ripple, and transmitting the modulated pulse signal to the pulse demodulator. The method further includes demodulating, at the pulse demodulator, the modulated pulse signal into a demodulated signal representative of the voltage ripple, and controlling a switching operation of the DC-DC converter to reduce the voltage ripple at an output of the DC-DC converter based on the demodulated signal.

Transmitting the modulated pulse may include transmitting the modulated pulse signal via an isolator. Modulating the pulse signal may include modulating a width of the pulse signal, modulating a frequency of the pulse signal, etc.

The power supply may include a filter coupled between the PFC circuit and the pulse modulator, and the method may include filtering a voltage at the output of the PFC circuit to provide a signal indicative of the voltage ripple at the output of the PFC to the pulse modulator.

The method may include converting, at the pulse modulator, the voltage ripple from an analog signal to a digital signal prior to modulating the pulse signal.

The method may include sensing a voltage at the output of the DC-DC converter and comparing the sensed voltage to a voltage reference to define a feedback signal. Controlling the switching operation of the DC-DC converter may include controlling the switching operation of the DC-DC converter to reduce the voltage ripple at an output of the DC-DC converter based on the demodulated signal and the feedback signal.

Any of the example embodiments and aspects disclosed herein may be used in any suitable combination with any other example embodiments and aspects disclosed herein without departing from the scope of the present disclosure. For example, AC-DC power supplies described herein may implement other control methods, the control methods described herein may be implemented in other AC-DC power supplies, etc. without departing from the scope of the present disclosure.

Example embodiments and aspects of the present disclosure may provide any of the following advantages: reducing a voltage ripple (e.g., line frequency voltage ripple) at an output of a power supply, improving input dynamics, improving output dynamic response of the power supply, lowering distortion, increasing resistance to noise, providing isolation between a primary and secondary side of the power supply, providing digital pulse width modulation and demodulation, compatibility with existing MCU and DSP controls, ease of implementation with current DSP designs, lower cost, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. An isolated AC-DC power supply comprising:
   an input terminal for receiving an AC voltage input;
   an output terminal for providing a DC voltage output;
   a PFC converter coupled to the input terminal;
   a DC-DC converter coupled between the PFC converter and the output terminal;
   a controller coupled to the DC-DC converter and configured to control switching operation of the DC-DC converter;
   a pulse modulator coupled to an output of the PFC converter to receive a signal representative of voltage ripple at the output of the PFC converter, the pulse modulator configured to modulate a pulse signal based on an amplitude of the voltage ripple; and
   a pulse demodulator coupled to the pulse modulator to receive the modulated pulse signal, the pulse demodulator configured to demodulate the modulated pulse signal and provide a demodulated signal to the controller to adjust switching operation of the DC-DC converter.

2. The power supply of claim 1, further comprising an isolator coupled between the pulse modulator and the pulse demodulator to isolate the pulse modulator from the pulse demodulator.

3. The power supply of claim 2, wherein the isolator comprises an opto-coupler.

4. The power supply of claim 2, wherein the isolator comprises a transformer.

5. The power supply of claim 1, further comprising a filter coupled between the PFC converter and the pulse modulator, the filter adapted to filter a voltage at the output of the PFC converter and provide a voltage ripple signal to the pulse modulator representative of a voltage ripple at the output of the PFC converter.

6. The power supply of claim 5, wherein the filter comprises a bandpass filter.

7. The power supply of claim 5, wherein the pulse modulator includes an analog-to-digital (ADC) converter adapted to convert an voltage ripple signal received from the filter into a digital signal to be modulated by the pulse modulator.

8. The power supply of claim 1, wherein the pulse modulator is configured to generate the pulse signal using pulse width modulation (PWM).

9. The power supply of claim 1, wherein the pulse modulator is configured to generate the pulse signal using pulse frequency modulation (PFM).

10. The power supply of claim 1, further comprising a sensor coupled between the output terminal and the controller to provide output voltage feedback to the controller for controlling switching operation of the DC-DC converter.

11. The power supply of claim 10, wherein the controller is configured to receive a voltage reference indicative of a desired output voltage of the AC-DC power supply, and the controller is configured to control switching operation of the DC-DC converter based on a comparison of the output voltage feedback to the voltage reference and based on the feedforward demodulated signal from the pulse demodulator.

12. The power supply of claim 1, wherein the pulse modulator is located on a primary side of the power supply and the pulse demodulator is located on a secondary side of the power supply.

13. The power supply of claim 1, wherein the controller is configured to adjust switching operation of the DC-DC converter based on the demodulated signal to reduce voltage ripple at the output of the DC-DC converter.

14. A method of operating an isolated AC-DC power supply, the power supply including a PFC converter coupled to a DC-DC converter, a pulse modulator coupled to an output of the PFC converter, and a pulse demodulator coupled to the pulse modulator, the method comprising:
   receiving, at the pulse modulator, a voltage ripple of the voltage at the output of the PFC circuit;
   modulating, at the pulse modulator, a pulse signal based on an amplitude of the voltage ripple;
   transmitting the modulated pulse signal to the pulse demodulator;
   demodulating, at the pulse demodulator, the modulated pulse signal into a demodulated signal representative of the voltage ripple; and
   controlling a switching operation of the DC-DC converter based on the demodulated signal.

15. The method of claim 14, wherein transmitting the modulated pulse includes transmitting the modulated pulse signal via an isolator.

16. The method of claim 14, wherein the power supply further includes a filter coupled between the PFC circuit and the pulse modulator, the method further including filtering a voltage at the output of the PFC circuit to provide a signal indicative of the voltage ripple at the output of the PFC to the pulse modulator.

17. The method of claim 14, further comprising converting, at the pulse modulator, the voltage ripple from an analog signal to a digital signal prior to modulating the pulse signal.

18. The method of method claim 14, further comprising sensing a voltage at the output of the DC-DC converter and comparing the sensed voltage to a voltage reference to define a feedback signal.

19. The method of claim 18, wherein controlling the switching operation of the DC-DC converter includes controlling the switching operation of the DC-DC converter to reduce the voltage ripple at an output of the DC-DC converter based on the demodulated signal and the feedback signal.

20. The method of claim 14, wherein controlling the switching operation of the DC-DC converter includes to controlling the switching operation of the DC-DC converter reduce the voltage ripple at an output of the DC-DC converter based on the demodulated signal.

21. The method of claim 14, wherein modulating the pulse signal includes modulating a width of the pulse signal.

22. The method of claim 14, wherein modulating the pulse signal includes modulating a frequency of the pulse signal.

* * * * *